L. S. ABBOTT.
PROCESS OF AND APPARATUS FOR MAKING HALIDES.
APPLICATION FILED MAY 11, 1917.
1,308,885.
Patented July 8, 1919.
2 SHEETS—SHEET 1.
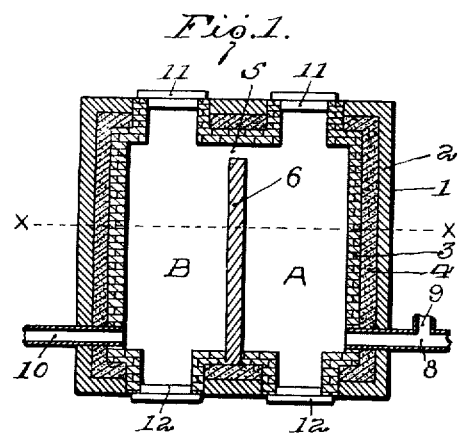
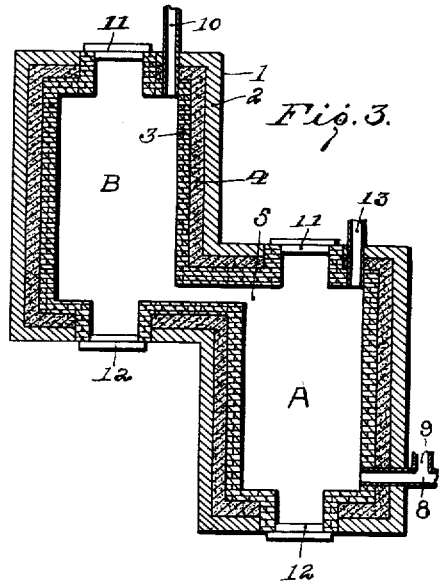
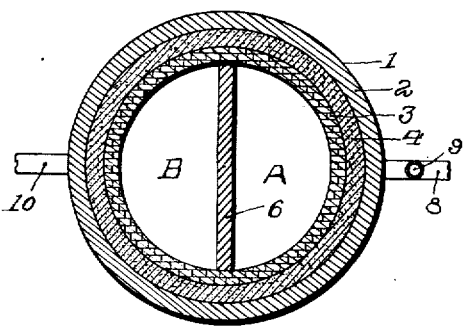
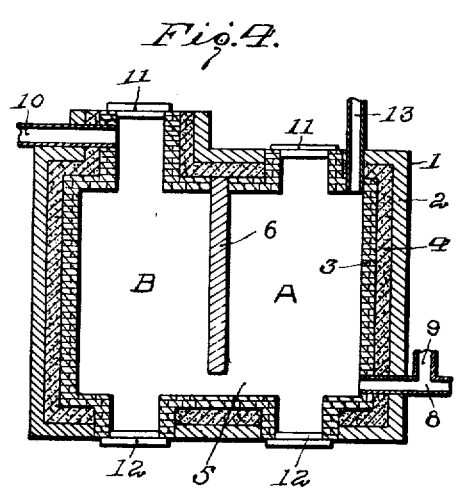
Witness
A. M. Houghton
Inventor
Lyle Stockton Abbott.
By W. P. McElroy
Attorney L. S. ABBOTT.
PROCESS OF AND APPARATUS FOR MAKING HALIDES.
APPLICATION FILED MAY 11, 1917.
1,308,885.
Patented July 8, 1919.
2 SHEETS—SHEET 2.
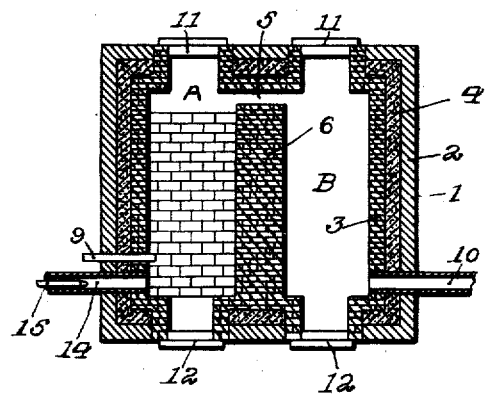
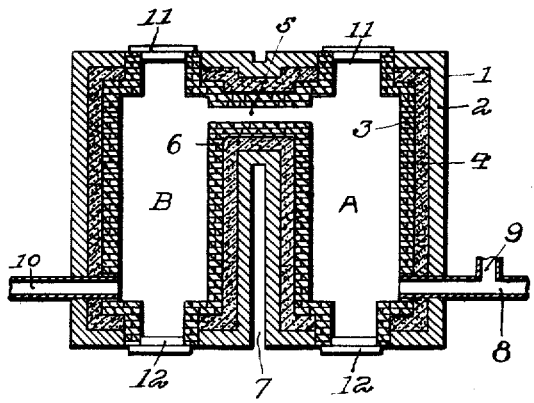
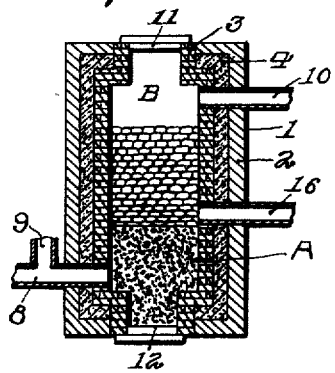
Inventor
Lyle Stockton Abbott
By K. P. McElroy
Attorney
Witness
A. McLoughlin

UNITED STATES PATENT OFFICE.

LYLE STOCKTON ABBOTT, OF PORT ARTHUR, TEXAS, ASSIGNOR TO GULF REFINING COMPANY, OF PITTSBURGH, PENNSYLVANIA, A CORPORATION OF TEXAS.

PROCESS OF AND APPARATUS FOR MAKING HALIDS.

1,308,885.  Specification of Letters Patent.  Patented July 8, 1919.

Application filed May 11, 1917. Serial No. 167,962.

*To all whom it may concern:*

Be it known that I, LYLE STOCKTON ABBOTT, a citizen of the United States, residing at Port Arthur, in the county of Jefferson and State of Texas, have invented certain new and useful Improvements in Processes of and Apparatus for Making Halids, of which the following is a specification.

This invention relates to processes of and apparatus for making halids; and it comprises a method of making aluminum chlorid by the reaction between aluminous material, carbon and chlorin wherein all, or most of, the heat necessary for effecting such reaction is supplied by preheating the chlorin by means of the combustion of fuel in the path traversed by the chlorin in reaching the reaction mixture of alumina and carbon, as by blowing up an ignited fuel mass with air until it reaches a high temperature and then passing the chlorin through such mass on its way to the reaction chamber, or by temporarily producing combustion in a checkerwork or the like and then sending the chlorin therethrough; and it also comprises a combination of apparatus elements including a reaction chamber adapted for the production of aluminum chlorid, a combustion chamber, means for introducing fuel into such chamber, means for introducing air into such chamber, means for removing waste gases from such chamber without passing through the reaction chamber, and means for passing chlorin through the combustion chamber and thence through the reaction chamber; all as more fully hereinafter set forth and as claimed.

Aluminum chlorid is a highly reactive chemical susceptible of use in many arts. The present methods of production, however, are expensive and uneconomical. There are two main methods at present in use, one being to pass chlorin (more rarely hydrochloric acid) over metallic aluminum, and the other to pass chlorin (more rarely hydrochloric acid) over a heated mixture of some sort of alumina, such as bauxite, with carbon.

In spite of the high cost of metallic aluminum, the former method is quite largely used because of the difficulties attending the performance of the latter. The reaction between aluminum, carbon and chlorin, while endothermic, does not require the supply of any great amount of heat though taking place only at a high temperature; but some heat much be supplied and the reaction mixture must be at or above a bright red heat. In practice it is difficult to supply heat and maintain the desired temperature by the usual method of placing the mixture of carbon and alumina in an externally heated retort and passing a current of chlorin through. The difficulties reside in the fact that the mixture must be open-textured and pervious to allow passage of chlorin and such a mixture does not transmit heat well. And in order to supply the necessary number of heat units to the interior of the mass, the retort must be very highly heated. The retort must of course be gas tight and refractory to the action of carbon, of chlorin and of aluminum chlorid at a very high temperature. It is hard to find materials combining all the necessary qualities from which walls can be made thin enough to permit a ready transmission of heat without fissuring, cracking or becoming pervious and which will also withstand the corrosive action of the contents of the retort. From a number of points of view, it is necessary to maintain a tight, impervious retort through which heat will be readily conveyed. It is desirable that there be no cracks or leaks through which aluminum chlorid or chlorin can escape. An increase of the thickness of the retort walls is not a sufficient remedy, as it seriously decreases the amount of heat which can be transmitted through the retort walls to the reacting materials. If, as is usually done, the temperature outside the retort be made much higher than that inside, there is apt to be cracking of the retort walls due to the difference in temperature (and expansion) between the outside and inside surfaces.

In the present invention I transmit the necessary heat to the reaction mass in another way. I do not convey the heat, or any important amount of it, through a wall, as in usual types of retorts, but transmit all of the heat, or most of it, to the reaction mass by preheating the chlorin. It is of course theoretically possible to preheat chlorin for this purpose in a wide variety of different devices wherein heating is through a wall; as in passing the chlorin through a tile or the like while producing combustion outside the tile. But in practice these propositions are open to the same objections as those noted with regard to heating the reaction mass in a retort; it is difficult to find materials withstanding the action of chlorin at the temperatures here contemplated. Instead I perform combustion of fuel in a chamber or the like and after a high degree of heat has been attained, I cease the combustion therein and transmit the chlorin through the chamber. In so doing, the objections previously noted do not obtain, since the walls of the chamber can of course be made of any desired refractory material and may be compound in their nature. I may, for instance, line the chamber with any suitable refractory brick or materials and then cover it exteriorly with a layer of heat insulating material, such as kieselguhr, bauxite, charcoal, etc. Around the whole structure may be put an iron or steel casing. With such a structure, leaks in the lining of the reaction chamber proper are of course immaterial and the surrounding casing of steel provides all the tightness that is necessary. There are several ways of effecting the described preheating within the purview of this invention. In one way, I simply provide an ordinary checkerwork chamber containing firebrick, silica brick, bauxite brick, etc., and produce combustion within this chamber by means of oil or gas. When the checkerwork chamber is at the necessary high temperature, I cut off the flow of fuel and of air and pass chlorin through the checker. In the checker the chlorin picks up the heat and goes forward to the reaction chamber at a temperature sufficient to cause reaction to take place for a relatively long time. In practice I find that three to five minutes heating up in the checkerwork chamber will allow me to operate in the reaction chamber for an hour or so. The products of combustion formed in the checker chamber are not sent through the reaction mass but are disposed of through special outlets. This is desirable for the reason that the maximum temperature can be obtained only by complete combustion of fuel, i. e., the formation of $CO_2$ and $H_2O$, but the products of complete combustion on passage through the reaction mixture at a high temperature would rob it of carbon by a well understood reaction. Instead of using a special checkerwork heated with oil or gas, it is convenient to use a chamber filled with coke or coal and simply blow air through it for a time. A portion of the coke or coal burns, heating the rest of it to a high temperature. By now interrupting the air and blowing chlorin through the hot mass, the heat is given up to the chlorin. This method of heating the chlorin is possible for the reason that chlorin does not attack carbon at high temperatures. In blowing up the coke or coal I prefer to blow rapidly to produce combustion to $CO_2$ rather than to CO, using the blowing methods well known in the water gas industry. This is for the reason that complete combustion of carbon to $CO_2$ yields much more heat than incomplete combustion to CO; and I am here only interested in combustion as a means of heating residual carbon. After blowing up the mass of carbon, chlorin is sent through it, as stated. As described, the method is discontinuous, the carbon mass being alternately blown with air to heat it and then used for heating the chlorin. It is not desirable to make the process continuous by transmitting air and chlorin together through the hot carbon, for the reason that in so doing combustion must be limited to the formation of CO ("producer gas") rather than the formation of $CO_2$ and the fuel mass does not become as hot or store up as much heat as is desirable. Combustion of carbon to CO only gives about 30 per cent. of the total heat of complete combustion of carbon, that is, to $CO_2$. And with simultaneous passage of air and chlorin through the fuel, the producer gas formed in passing through the reaction mass with the chlorin dilutes the chlorin and renders the chlorinating action slow and uneconomical while the volume of gases passing through the condensation chamber for aluminum chlorid impedes condensation. For like reasons, I do not ordinarily put the heating carbon in the same chamber with the reaction mass, although this can be done; as, for instance, by placing a layer of carbon in a reaction chamber with a layer of the reaction mass above it, then passing air through the lower mass to heat it, the gases produced by the action of the air being removed laterally above the lower mass, cutting off the air and then passing chlorin through the assemblage; that is through both layers. This method I do not regard however as being as advantageous as the heating up of the carbon and the reaction mass in separate chambers. Using separate chambers they may be separated by a heat conductive wall or partition and some amount of the heat allowed to pass through this wall. But, as noted, I do not rely upon the conduction of any important amount of heat through a heat conductive wall as in the old retort practice. It is convenient however to have both the heating up chamber and the reaction chamber with a common casing, thereby securing whatever advantage there may be in heat conduction and reducing radiating surface.

In the accompanying illustration I have shown, more or less diagrammatically, various combinations of apparatus elements within the present invention and useful in the performance of the stated process. In this showing Figure 1 is a central vertical section of one form of apparatus having a blowing up chamber and reaction chamber within a common casing;

Fig. 2 is a horizontal section on line x—x of Fig. 1;

Figs. 3, 4, 5, 6, and 7 are similar views of different modifications.

In the several different views, where applicable, the same reference numerals designate corresponding parts. The apparatus comprises a steel shell or casing 1, covering the brick walls 2, and interior lining of firebrick or refractory material 3. This lining is spaced away from the brick work 2 to provide a space which is filled with a pulverulent heat insulating material such as kieselguhr 4, or the like. Each apparatus comprises two chambers, A and B, the former being the preliminary heating or blowing up chamber and the latter being the reaction chamber. These chambers are in communication with each other through passage 5 (Figs. 1, 3, 4, 5, and 6) or are in direct communication with each other (Fig. 7).

The passage 5 may be arranged at the top of the two chambers as is shown in Figs. 1, 5 and 6, at the bottom of the two chambers as is shown in Fig. 4, or such passage may connect the top of one chamber with the bottom of the other as is shown in Fig. 3. Advantageously the apparatus is divided into two chambers by means of a partition, which may be of firebrick or refractory material such as clay and the like. In Figs. 1 and 5 this partition 6 extends from the bottom upwardly. In Fig. 4 it extends from the top downwardly; while in Fig. 6 it may comprise the two opposing walls of separately built chambers A and B. The partition wall need not contain insulating material in the form shown in Figs. 1, 4 and 5 where the two chambers comprise substantially one apparatus. However, as is shown in Fig. 6, the partition wall should be provided with the layer of insulating material 4 since the two chambers A and B are separated as is shown at 7.

Chamber A is the preliminary heating or blowing up chamber and is provided with a filling of coke. Each such chamber A has an inlet 8 for introduction of air and inlet 9 for the introduction of chlorin. Each chamber B is provided with an outlet 10 for exit of aluminum chlorid vapors. Each chamber is further provided at the top and bottom with openings 11 and 12, respectively, for introduction and removal of the coke of chamber A and bauxite and carbon of chamber B. Each opening is provided with a cover designated by the same reference numeral as the opening.

The operations of the different forms of apparatus are as follows:

In Fig. 1, chamber A is filled with coke or any other carbonaceous fuel up to a point near its top, while chamber B is similarly filled with a reaction mass, such as bricks or briquets of a mixture of alumina (bauxite) and carbon. Air is then blown in to A through inlet 8, the door 11 being temporarily open for exit of products of combustion. The fuel in A soon comes to a high state of incandescence. It is advisable to force in the air so rapidly that the combustion is to $CO_2$ rather than to CO, for reasons stated ante. Blowing up is continued until the fuel bed is raised to, say, 2700 to 2800° F. With apparatus capable of holding a ton or so of reaction mixture and a corresponding bulk of coke, this will ordinarily not take to exceed 5 minutes. When the coke is brought to incandescence, top door 11 is closed and introduction of air discontinued. Chlorin is then run in through inlet 9 and passes upward through the hot coke, picking up its heat, and passes in a superheated state from the top of the wall through passage 5 into chamber B where it passes downward through the alumina-carbon reaction mixture, forming aluminum chlorid and CO by a well understood reaction. Some heat passes through the partition wall 6. The aluminum chlorid vapors escape through outlet 10, whence they are taken to a suitable condensing chamber. When the temperature in chamber B falls to a point where the reaction is no longer quick and ready, the introduction of chlorin is discontinued. Air is now introduced at 8 till residual chlorin is blown over into B, the cover of chamber A removed to permit escape of products of combustion and blasting continued till the fuel in A is once more incandescent. The aluminum chlorid producing phase of the cycle may now be resumed. Ordinarily it is not necessary to blow up the fuel bed more than a few minutes preliminary to a run of an hour or so.

The operation of Fig. 3 is similar to that of the apparatus of Fig. 1 except that during the aluminum chlorid making phase the chlorin after being preliminarily heated in chamber A passes through the passage 5 upwardly through chamber B and the aluminum chlorid vapors also pass upwardly to exit 10.

In Fig. 3 coke in chamber A may be brought to incandescence by blowing air through 8 upwardly and permitting the products of combustion to escape through the opening at 11 or through the exit 13, the top and bottom covers and exit 10 of chamber B being closed. Or if desired, the blowing up of chamber A may be accomplished in a downward direction by admitting air in 13 and removing the products of combustion either through the bottom opening at 12, the pipe 8, or both. In the apparatus shown in Fig. 3 the chlorin is introduced at 9, passes through pipe 8 and thence up through the incandescent fuel, through passage 5 and thence up through chamber B forming aluminum chlorid vapors which find exit through pipe 10.

In the apparatus of Fig. 4 the coke in chamber A may be brought to incandescence either through a downward run of the air through pipe 13 with exit at 8 and 12 or through an upward introduction of the air through 8 with exit of products of combustion at 11 or 13 just as in the case of the apparatus of Fig. 3. However, in this form the chlorin is introduced through pipe 13 during the aluminum chlorid making phase and passes downwardly through the incandescent coke abstracting heat therefrom and thence passes through passage 5 and upwardly through the reaction material in B, the aluminum chlorid vapors formed finding exit at 10.

The apparatus of Fig. 5 is somewhat similar to that of Fig. 1, the preliminary heating or blowing-up chamber in this instance being provided with a checkerwork of refractory material such as is used in heat regenerators. In the operation of the apparatus of Fig. 5 the checkerwork is heated through the burner apparatus comprising air inlet 14 and oil or gas inlet 15. The flame produced by this burner heats the checkerwork and the products of combustion find exit through the opening at 11, the cover being removed. When the checkerwork has been sufficiently heated, chlorin is admitted through pipe 9 and passes upwardly through the checkerwork abstracting heat therefrom and thence passes through passage 5 and downwardly through chamber B containing the reaction material. The aluminum chlorid vapors escape at 10.

The operation of the apparatus of Fig. 6 is similar to that of Fig. 1, the apparatus of Fig. 6 being structurally slightly different from that of Fig. 1. In Fig. 6 the chambers A and B, so to speak, are separate while in Fig. 1 these chambers are sub-chambers of a complete apparatus.

In Fig. 7 instead of having the chambers A and B separated by a passage they are, in effect, formed by the coke and the reaction mixture. The coke or other carbonaceous fuel is contained in the bottom portion of the apparatus of Fig. 7 and extends up to a point just below the exit 16. Above this coke is a layer of reaction material. The air for blowing up the coke enters through pipe 8 and the products of combustion find exit at 16, covers 11 and 12 and exit 10 being closed. After the coke has reached a state of incandescence, exit 16 is closed and chlorin is admitted through 9 or 8. This chlorin abstracts the heat from the coke and passes in a heated condition through the reaction material in B, aluminum chlorid vapors formed finding exit at 10, cover 11 being closed. The two masses being in contact heat is propagated from one to the other. In the other structures combustion can be to $CO_2$ while with this structure it is better practice to have only a semi-combustion, i. e. to burn to CO as in a gas producer. This is for the reason that carbon dioxid if formed in the incandescent coke mass would be reduced to carbon monoxid with a cooling effect and abstraction of carbon, in gaining access to the charge of reacting material; and it is difficult to prevent wholly this access with the structure shown. Reduction of $CO_2$ to CO by carbon would of course not only absorb heat in the charge mass but would also lead to a waste of carbon. The structure of Fig. 7 may also be used with a reverse operation, the coke forming the upper layer and the reaction mass the lower layer. In so operating air may be introduced through 10 and producer gas removed through 16 until the temperature of the coke is high enough. At this time 16 may be closed and chlorin led in through 10. The chlorin now passes downwardly through the coke and through the reaction mixture and aluminum chlorid vapors formed escape at 8.

In the operation of the apparatus of all the figures of course the covers 11 and 12 are closed and opened at the proper time in order that the gases may pass in proper circuit through the apparatus. The openings serve for the introduction and removal of the coke and reaction material.

While I have described the reaction mixture as composed of alumina, such as bauxite, mixed with carbon, it is obvious that any other aluminous material may be used, such as aluminum itself, aluminum carbid, aluminum sulfid, etc. Another aluminous material which may be used is a coky residue which is produced in various methods of treating oils, and particularly petroleum oils, with aluminum chlorid. The present process is well adapted for the recovery of aluminum chlorid from this latter material (see Patent 1,099,096). In using alumina and carbon the mixture may be briqueted or agglomerated or be in any other desired form. Briquets of bauxite and coking coal coked together are convenient.

While I have hereinbefore stated only the use of chlorin it is obvious that any other gas comprising chlorin such as various volatile carbon chlorids may be employed as may be a mixture or combination of CO and $Cl_2$ (phosgen). Gaseous HCl may also be employed although with HCl the blowing period must be longer than with pure chlorin since a higher degree of heat is necessary in using HCl than in using chlorin; the reaction which leads to the formation of aluminum chlorid being more endothermic.

HCl gas may be made from any suitable source as by decomposing salt with sulfuric acid, roasting salt with sulfids, etc. In roasting or heating the stated carbonaceous residues from the purification of oil with aluminum chlorid, particularly if such residues have been exposed to moisture, there is a generation of HCl mixed with various hydrocarbon gases. This mixture may be used instead of specially prepared hydrochloric acid.

The present process is of course also applicable to the use of the other halogens than chlorin, that is bromin and iodin, and to the formation of other volatile chlorids or halids than aluminum chlorid. It may for instance be used for making aluminum bromid by substituting bromin vapors for chlorin in the described method. Tin chlorid, tin bromid, iron chlorid, etc. and a wide variety of other volatile metallic halids may be made in the same manner as hereinbefore described for the manufacture of aluminum chlorid using the appropriate oxid and halogen.

The process of making aluminum chlorid of the present invention is particularly advantageous since it does not involve heat conduction through walls. The amount of heat required in converting alumina into aluminum chlorid with the aid of carbon and chlorin is not great although the temperature necessary is fairly high. But in order to secure efficient contact between the gas and the two solids the charge must be open and pervious and such a charge conducts heat very badly. In using retorts therefore they must be heated to an unduly high degree. But as the amount of heat required is, as stated, after all very little, it is perfectly practical to provide this amount of heat by superheating the chlorin and in so doing the charge may be made as open and pervious as may be desired with the result of presenting a large reaction mass and giving a high utilization of chlorin. The apparatus may of course be made of indefinitely large size; something which is not true of a retort or any apparatus where heating must be through a wall. Since neither chlorin nor HCl acts upon glowing carbon either may be passed through an incandescent coke charge without fear. In using chlorin, however, it is better that the coke be first well blasted to free it of hydrogen, moisture and hydrocarbons. Any suitable kind of coke may be employed, its purity or quality not being particularly important. Petroleum coke is well adapted for the present purposes.

In the performance of the process it is advisable that the producer gas or products of combustion of the blowing up stage be not carried over into and through the charge of reaction mixture to any greater extent than can be avoided. As stated carbon dioxid is reduced by the carbon of the charge, absorbing heat and wasting carbon. Further, any gases which may be in the charge will dilute the chlorin to that extent and render reaction slower as well as impede condensation of vapors of aluminum chlorid.

For this reason I do not contemplate in this invention running a mixture of air and chlorin through both charges so as to make the process continuous. So to do would require a much longer column of reaction material to insure complete utilization of the chlorin and is otherwise inconvenient.

I regard this invention as covering a method and means wherein fuel can be blasted and burnt either to CO or $CO_2$ (but most advantageously to $CO_2$) and the resulting heat is stored within the fuel bed or in masonry or checkerwork and the like during one phase and in the next ensuing phase the heated fuel bed or masonry or checkerwork is used to give up its heat to a current of chlorin or other gas comprising a halogen which is then passed through an aluminous charge; the heat so supplied being sufficient for that required for the reaction in forming aluminum chlorid.

With any of the structures shown the two phases of blasting and operating may be alternated for indefinitely long periods without shut-down except long enough to replenish supplies of fuel and reacting material. With apparatus of a size adapted for holding, say, 1500 pounds of coke and 1500 pounds of a reaction mixture of bauxite and alumina and supplied with chlorin, as a rule about 3 to 5 minutes are required for the blasting phase and the operation phase may be continued for an hour to an hour and a half; the relative length of time of course depending somewhat upon the heat insulation of the apparatus. With such an apparatus the consumption of fuel in the blasting phase will be about 20 to 25 pounds of coke and during the operating phase the production of aluminum chlorid will run from 55 to 100 pounds.

Since the object in the heating phase is to store up heat it is undesirable to dilute the air used in blasting with endothermics such as steam or products of combustion. Although with a low grade coke having a tendency to clinker it may sometimes be better to blast it to a lower temperature and repeat the heating phase oftener. In using petroleum coke which may be made unusually free not only of sulfur and of volatile bodies but of ash constituents, no clinkering difficulties occur. The same is true of charcoal. And I find in practice that even with ash-rich coke there is but little difficulty due to clinkering; a fact probably due to the removal of iron and alumina by the hot chlorin in the operating phase.

The present process is as stated well adapted for the recovery of aluminum chlorid contained in residues produced in various methods of treating oils. Any hydrogen coming from the hydrocarbons in the residue and combining with the chlorin to form HCl, or any HCl formed by the action of moisture on the aluminum chlorid, makes no difference. Hydrogen chlorid, HCl, acts in the same manner as chlorin in the present invention; and the heat brought in by the chlorin suffices to cause the HCl to react. The action of the chlorin soon breaks up any hydrocarbons that may be present.

Various other aluminous materials may be used, such as the hydrated aluminum chlorid obtained in the operation of the method of Patent 1,444,304. This material may be mixed with carbon and agglomerated, and treated either with chlorin or with HCl. The HCl obtained in the method of Patent No. 1,099,096 may be so utilized.

What I claim is:—

1. The process of making aluminum chlorid which comprises establishing and maintaining a heated pervious mass of alumina and carbon, and alternately burning fuel in a suitable chamber and passing chlorin through such chamber, the chlorin after passage through such chamber being then passed through said pervious mass.

2. The process of making aluminum chlorid which comprises establishing and maintaining a heated pervious mass of alumina and carbon in a suitable chamber, establishing and maintaining a mass of ignited carbon in another chamber and alternately passing chlorin successively through the second said chamber and the first said chamber and blowing the second said chamber with air, the products formed by the air being removed from the second chamber without passage through the first chamber.

3. The process of making aluminum chlorid which comprises establishing and maintaining two ignited masses containing carbon out of contact with each other but in heat communicating relationship, one such mass containing alumina and the other being fuel, passing air through the fuel until it reaches a high degree of temperature and removing the product formed thereby and after the high degree of temperature is reached passing chlorin through such fuel mass into the mass containing alumina and carbon, the passage of air and of chlorin through the fuel mass being alternated as often as may be necessary to maintain a reacting temperature in the mass comprising carbon and alumina.

4. In the manufacture of aluminum chlorid from a reaction mass of alumina and carbon with the aid of chlorin, the process which comprises keeping up the temperature of such mass by the introduction of the chlorin in a preheated state, all or substantially all of the heat so required being so communicated to the reaction mass.

5. In the manufacture of aluminum chlorid from a reaction mass of alumina and carbon with the aid of chlorin, the process which comprises keeping up the temperature of such mass by the introduction of the chlorin in a preheated state, all or substantially all of the heat so required being so communicated to the reaction mass, and the preheating being effected by temporarily interrupting the flow of chlorin and establishing combustion in a chamber through which the chlorin normally flows toward such reaction mass.

6. In the manufacture of aluminum chlorid from a reaction mass of alumina and carbon with the aid of chlorin, the process which comprises keeping up the temperature of such mass by the introduction of the chlorin in a preheated state, all or substantially all of the heat so required being so communicated to the reaction mass, and the preheating being effected by temporarily interrupting the flow of chlorin and establishing combustion in a chamber through which the chlorin normally flows toward such reaction mass, said chamber containing a mass of ignited carbon.

7. In the manufacture of aluminum chlorid the process which comprises establishing and maintaining a heated body of alumina and carbon at a temperature at which reaction with chlorin will occur, establishing a body of hot ignited fuel, passing chlorin through such fuel and then through the reaction mass and from time to time interrupting the flow of chlorin and passing air through said ignited fuel to raise its temperature, the passage of air being so conducted as to produce a substantially complete combustion which production of $CO_2$ and the products of combustion being removed from the fuel mass without passing through the reaction mass.

8. In the manufacture of halids from oxids, carbon and a halogen the process which comprises establishing a pervious mass of a mixture of such oxid and carbon in a suitable chamber, from time to time establishing combustion in a second chamber, interrupting the combustion and passing a halogen through the second chamber and then through the first chamber, the combustion and the passage of halogen being in alternation and the products of combustion from the second chamber not passing through the first chamber.

9. In the manufacture of aluminum chlorid the process which comprises establishing a hot mass of aluminous material in one chamber, intermittently producing combustion in a second chamber to heat the same and between periods of combustion transmitting a gas comprising chlorin through said chamber to and through said first chamber to produce aluminum chlorid in said first chamber.

10. In the manufacture of aluminum chlorid the process which comprises establishing a hot mass of aluminous material in one chamber, intermittently producing combustion in a second chamber to heat the same and between periods of combustion transmitting chlorin through said chamber to and through said first chamber to produce aluminum chlorid in said first chamber.

11. In the manufacture of volatile aluminum halids the process which comprises establishing a hot mass of aluminous material in one chamber, intermittently producing combustion in a second chamber to heat the same and between periods of combustion transmitting a draft current comprising halogen through said chamber to and through said first chamber to produce an aluminum halid in said first chamber.

12. The process of making aluminum chlorid which comprises alternately heating a body of heat storing material by combustion in contact therewith and transmitting a draft current comprising chlorin first into contact with said material and then into contact with a hot mass of aluminous material.

13. The process of making aluminum chlorid which comprises establishing and maintaining adjacent heated bodies of carbon and of aluminous material in heat exchanging relationship and alternately passing a draft current comprising chlorin and one of air through the carbon mass, the chlorin containing current being also passed through the aluminous mass while the air current is passed only through the carbon mass.

14. In an aluminum chlorid apparatus a chamber adapted for containing a reaction mass of alumina and carbon, provided with means for supplying material to said chamber, and means for removing waste solids, an outlet conduit for aluminum chlorid, a second preheating chamber adapted for combustion therein, provided with means for supplying fuel to said chamber, and means for removing waste gases from said chamber, means for introducing air into said chamber, means for supplying chlorin in said chamber and conduit means connecting the two chambers whereby the chlorin passing through the combustion chamber may gain access to the reaction chamber.

15. An apparatus for manufacturing volatile metallic halogen compounds which comprises a reaction chamber adapted for containing a hot pervious mass of a mixture of an oxid and carbon and provided with means for replenishing the mass, and means for removing waste solid materials, an outlet conduit for volatile halogen compounds, a second chamber, a conduit establishing communication between the two chambers, means for passing air into the second chamber, means for introducting fuel thereinto, means for removing products of combustion therefrom and means for passing halogen through the second chamber toward the conduit establishing communication between the two chambers.

16. An apparatus for forming volatile halogen compounds comprising a casing, a partition within said casing forming two separate chambers in heat communicating relationship, said casing being provided with means for introducing solid material into each chamber, and means for removing solid material from each chamber, means establishing a gas communication between the two chambers, means for removing vapors from one of said chambers, means for introducing halogen into the other of said chambers, means for introducing air into the other chamber and means for removing products of combustion from the other chamber.

17. An apparatus for manufacturing volatile metallic halogen compounds, which comprises a reaction chamber adapted for containing a hot pervious mass comprising metal, and provided with means for replenishing the mass, and means for removing waste solid materials, an outlet conduit for volatile halogen compounds, a second chamber, a conduit establishing communication between the two chambers, means for passing air into the second chamber, means for introducing fuel thereinto, means for removing products of combustion therefrom, and means for passing gases comprising halogen through the second chamber toward the conduit establishing communication between the two chambers.

In testimony whereof I affix my signature hereto.

LYLE STOCKTON ABBOTT.